Dec. 25, 1956   C. H. HOLSCLAW   2,775,468
HITCH FOR TRAILERS HAVING INDEPENDENTLY PIVOTED WHEELS
Filed Jan. 25, 1954
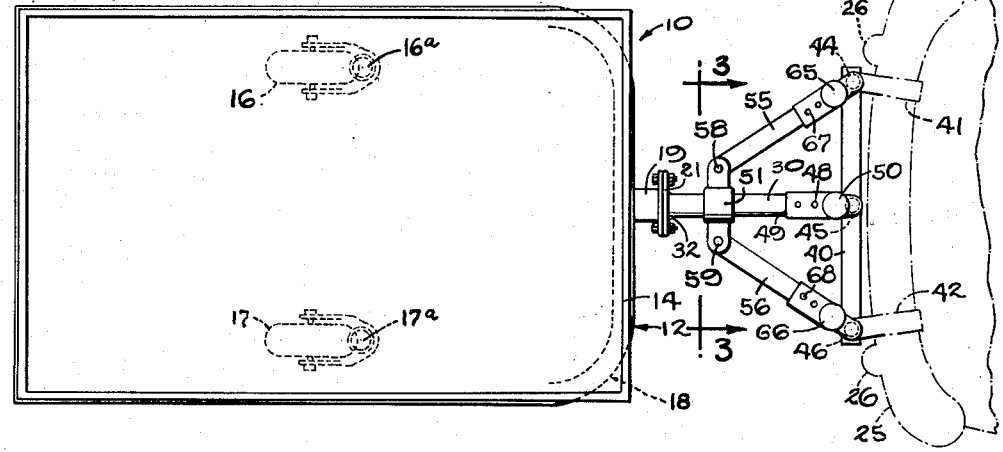
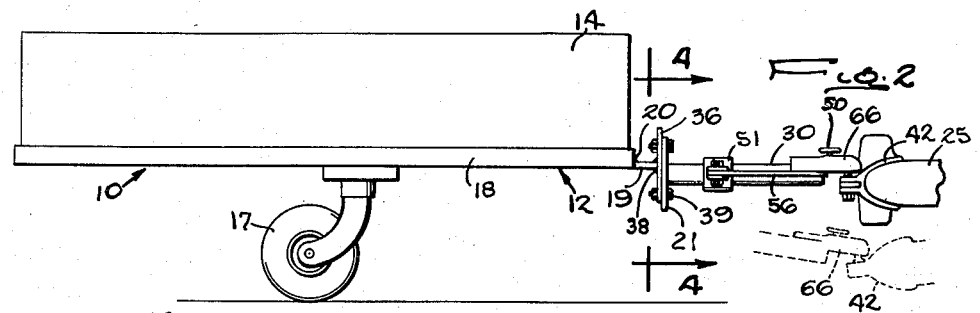
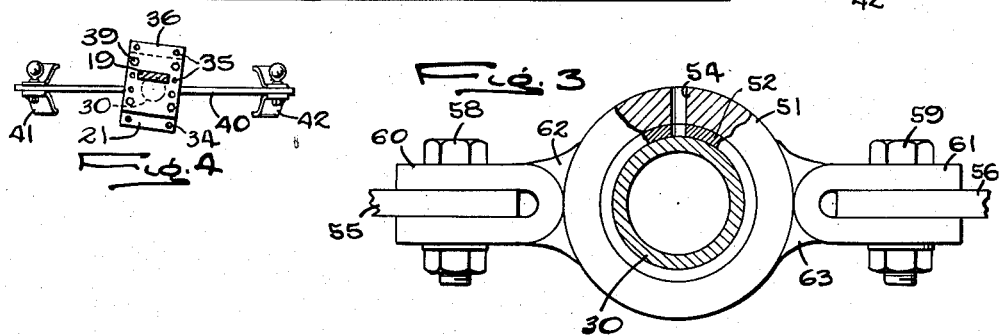
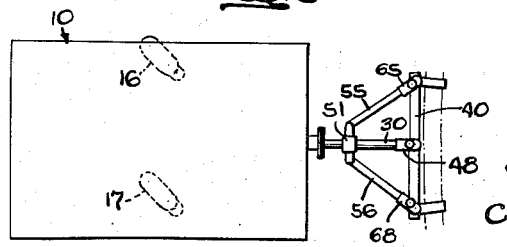
INVENTOR
Charles H. Holsclaw
Carlson, Pitzner, Hubbard & Wolfe
ATTORNEY

United States Patent Office 2,775,468
Patented Dec. 25, 1956

2,775,468

HITCH FOR TRAILERS HAVING INDEPENDENTLY PIVOTED WHEELS

Charles H. Holsclaw, Evansville, Ind.

Application January 25, 1954, Serial No. 405,702

4 Claims. (Cl. 280—457)

The present invention relates in general to trailer hitches for connecting wheeled trailers to towing vehicles, and more particularly, to such hitches for trailers having a plurality of wheels individually pivoted thereto about vertical axes.

It is the general aim of the invention to provide a trailer hitch for multiple pivot-wheeled trailers which, by a simple and economical organization, not only affords freedom for relative rocking of the trailer and towing vehicle about a transverse axis and about a fore and aft axis on uneven ground, but also prevents jackknifing of the trailer and vehicle about a vertical axis.

In a more specific aspect, it is an object of the invention to provide a trailer hitch which lets the trailer float relative to the vehicle upon traversing irregular ground or road surfaces thereby minimizing stresses on the hitch connection. At the same time, it is an additional object of the invention to prevent yawing of the trailer by a connection which positively assures that the trailer will "track" or follow the towing vehicle and permits steered backing of the two as a unit.

Other objects and advantages will become apparent as the following description proceeds, taken in conjunction with the accompanying drawings, in which:

Figure 1 is a plan view of a trailer hitch embodying the features of the invention and shown coupling an exemplary trailer to a typical towing vehicle;

Fig. 2 is a side elevation of the hitch trailer and vehicle shown in Fig. 1;

Fig. 3 is a detail view taken in section substantially along the line 3—3 in Fig. 1;

Fig. 4 is a sectional view taken along the line 4—4 in Fig. 2 and particularly illustrating how the hitched trailer may rock about a fore and aft axis relative to the towing vehicle; and Fig. 5 is a plan view similar to Fig. 1 and illustrating the hitched trailer as it follows the towing vehicle in rounding a corner.

While the invention has been shown and is described in some detail by reference to a particular embodiment thereof, there is no intention that it be thus limited to such detail. On the contrary, it is intended here to cover all alterations, modifications, and equivalents falling within the spirit and scope of the invention as defined by the appended claims.

Referring now to the exemplary embodiment of the invention here shown, a trailer hitch is illustrated as connecting a trailer 10 to a towing vehicle 11.

The trailer 10 and the vehicle 11 may take a variety of forms; examples are here illustrated to make clear the environment and operation of the invention. The trailer 10 in this instance has a welded steel frame 12 carrying a body 14 and supported for transport by a plurality (here, two) of wheels 16, 17 pivoted to swing freely and independently about spaced vertical axes 16a, 17a. For marginal support of the body 14 and for towing connection, the frame 12 includes an angle beam 18 rounded at the corners and presenting a forward portion on which a connection shank 19 is fastened, as by welding at 20. The towing vehicle 11 is by way of example here partially shown in dashed outline as a conventional automobile having the usual transverse rear bumper 25 with vertical guards 26.

The illustrative trailer hitch includes a central tongue 30, here shown as a tubular member, extending forwardly from the trailer 10. The tongue 30 is adapted to be fastened to the front of the trailer in this instance by a vertical plate 21 welded to the tongue's rear end as at 32. In order that the tongue 30 may be adjustable in height to keep the trailer level when hitched to vehicle bumpers of various elevations, the plate 21 is provided with a series of vertically spaced holes 34 adapted to register in pairs with matching holes 35 in a corresponding plate 36 secured as by welding at 38 to the shank 19. A pair of removable bolts 39 fasten the two plates 21 and 36 in selected relative positions.

The forward end of the tongue 30 is adapted for swivel connection to the rear of the vehicle 11, as here shown by the provision of a transverse bar 40 having bumper clamps 41 and 42 of conventional construction removably fastening its opposite ends to the bumper 25. The bar 40 carries three transversely spaced ball fittings 44, 45 and 46, the center one 45 receiving a socket member 48 welded or otherwise secured as at 49 to the tongue 30. Such ball and socket swivel connections are well-known per se, in the art. The socket 48 may be removed at will from the cooperating ball fitting 45 by a release mechanism including a handle 50.

The hitch as thus far described would work well enough during forward towing on absolutely level ground, providing the trailer were not unsymmetrically loaded. These ideal conditions are rarely met. The best road surfaces are not perfectly smooth and operation over rough terrain is often necessary with towed trailers. Reverse drive for maneuvering is desirable and often a vital requirement.

To permit realization of successful towing and backing of the trailer without undue strain on the bumper 25 or the hitch components, the invention contemplates means for bracing the trailer 10 relative ot the vehicle 11 against yawing movement about a vertical axis, while at the same time permitting relative rocking of the two about a horizontal fore and aft axis on uneven ground. Provision is made for a towing connection substantially along the longitudinal center line of the vehicle and for free rotation of lateral braces about such center line as the trailer and vehicle rock relatively there about.

In the illustrated form, the means for bracing the trailer 10 against yawing about a vertical axis relative to the trailer includes a bushing or sleeve 51 and a pair of forwardly diverging struts 55, 56. The sleeve 51 is rotatably and slidably disposed on the tongue 30, and the struts 55, 56 are pivoted at their rear ends to opposite sides of the sleeve. Additionally, the struts are adapted to have their forward ends swiveled at spaced locations to the bumper 25.

For a long-wearing smooth fit on the tongue 30, the sleeve 51 may include a bearing 52 inserted therein and may be provided with a lubricating hole 54. The pivotal connection of the struts 55, 56 to the sleeve 51 is accomplished, in this instance by bolts 58, 59 passed through matched openings in the struts 55, 56 and spaced V-shaped ears 60 and 61 secured as by welding at 62 and 63 to the sleeve's outer surface. The forward ends of the struts 55, 56 are adapted for swivel connection to the vehicle 11 at points spaced laterally on either side of the center tongue 30. For this purpose, the struts 55, 56 have ball sockets 65 and 66 fastened as by bolts 67 and 68, respectively. The sockets 65, 66 may be similar to socket 48 and are removably received in swiveled relation on the ball fittings 44 and 46, respectively. The spacing of the fittings 44 and 46 may vary considerably according to the width of the vehicle 11 and the size of the trailer to be handled. Such variations are accommodated by the struts 55, 56, though fixed in length, since their diverging angle may be increased or decreased by pivoting at their rear ends, and the sleeve 51 may be moved axially along the tongue 30.

As the vehicle 11 transports the trailer 10, a direct pull or push is established through the center tongue 30. The trailer 11 cannot skew in a horizontal plane relative to the vehicle inasmuch as the struts 55, 56 form rigid braces in that plane. The trailer 10, therefore, remains at all times immediately behind the rear of vehicle 11, taking corners by pivoting of its wheels 16, 17 (Fig. 5). No jackknifing (relative angling about a vertical axis) can occur. On the other hand, should the vehicle 11 rise or fall relative to the trailer 10, as in crossing a ditch, the entire hitch may pivot about the transverse axis on which the swivel ball joints lie (see dashed lines, Fig. 2). And upon bumpy or irregular ground the trailer may rock relative to the vehicle about a fore and aft axis defined by the center tongue since the laterally extending struts 55, 56 may rotate with the sleeve 51 about the center tongue.

It will be apparent from the foregoing that the present invention affords a trailer hitch which is relatively simple in construction and which can be readily removed from a trailer or towing vehicle. The single hitch is, therefore, extremely versatile and can be used in towing any of a number of trailers from different vehicles. Various transverse spacing of the outer swivel connections on different vehicles are readily accommodated by axial sliding of the sleeve 51 on the tongue 30 and pivoting of the struts 55, 56 to different diverging angles. Still more important, however, the hitch struts 55, 56 prevent jackknifing of the trailer and vehicle about a vertical axis, yet let the trailer float relative to the vehicle either about a transverse axis or about a fore and aft axis on uneven ground.

I claim:

1. A hitch for connecting a trailer supported on independently pivoted wheels to a towing vehicle comprising, in combination, a center tongue adapted to be rigidly fastened at one end to the front of the trailer and adapted at its other end for swivel attachment to the rear of the vehicle, a sleeve rotatably and axially slidable on said center tongue, a pair of struts each pivoted at one end to said sleeve and adapted for swiveled connection at the other end to the rear of said vehicle at locations laterally spaced on either side of said center tongue.

2. A hitch for connecting a multiple pivot-wheel trailer to a towing vehicle comprising, in combination, a center tongue adapted to be rigidly fastened to the front of the trailer in forwardly extending relation with the latter, means at the forward end of said tongue adapted for swivel connection to the rear of the vehicle, a sleeve rotatably and axially slidable on said tongue, a pair of struts pivoted at one end to said sleeve and adapted at the other end for swiveled connection to the rear of the vehicle at points spaced laterally on either side of said tongue, the lateral spacing of such points being adjustable upon axially sliding said sleeve along said tongue and rocking said struts relative to said sleeve, said struts preventing jackknifing of said trailer and vehicle, and said sleeve by rotation about said tongue permitting relative roll of said trailer and vehicle about a fore and aft axis.

3. A hitch for connecting a multiple pivot-wheel trailer to a towing vehicle comprising, in combination, a crossbar adapted to be mounted on the rear of the vehicle and having three ball-connection elements spaced thereon, a center tongue adapted to be rigidly fastened in forwardly extending relation to the front of the trailer, a ball socket fast on the forward end of said tongue for swivel connection to the center one of said three ball elements, a sleeve-like element rotatably and axially slidable on said tongue, a pair of struts pivoted at their rear ends to opposite sides of said sleeve element and diverging forwardly toward the outer ones of said ball elements, and ball sockets on the forward ends of said struts for swivel connection to respective ones of said outer ball elements.

4. A hitch for coupling a trailer having a frame supported on a plurality of ground wheels independently pivoted about vertical axes to an automobile having a rear bumper, said hitch comprising, in combination, a crossbar adapted to be clamped to said bumper and having three ball fittings spaced therealong, a tongue adapted to be fastened in rigid forwardly extending relation to said frame, a first ball socket rigid on the end of said tongue for removable swivel connection to the center one of said ball fittings, a rotatably and axially slidable bushing on said tongue having diametrically opposed ears, a pair of struts pivoted at their rear ends to respective ones of said ears and diverging forwardly, second and third ball sockets rigid on the respective forward ends of said struts for removable swivel connection to the respective outer ones of said ball fittings, said ball and socket connections permitting relative rocking of the trailer and automobile about a transverse axis, rotation of said bushing permitting relative rocking of the trailer and automobile about a fore and aft axis, and said struts preventing relative jackknifing of said trailer and automobile about a vertical axis.

References Cited in the file of this patent

UNITED STATES PATENTS

| | | |
|---|---|---|
| 2,085,260 | Keys | June 29, 1937 |
| 2,464,392 | Heavener | Mar. 15, 1949 |
| 2,519,856 | Schule | Aug. 22, 1950 |
| 2,653,032 | Ellis | Sept. 22, 1953 |